United States Patent Office 3,824,239
Patented July 16, 1974

3,824,239
DISUBSTITUTED DIETHANOL-AMINO-S-TRIAZINES
Thirumurti L. Narayan, Riverview, Moses Cenker, Trenton, Peter T. Kan, Plymouth, and John T. Patton, Jr., Wyandotte, Mich., assignors to BASF Wyandotte Corporation, Wyandotte, Mich.
No Drawing. Filed Dec. 29, 1972, Ser. No. 319,906
Int. Cl. C07d 55/18
U.S. Cl. 260—249.5       6 Claims

ABSTRACT OF THE DISCLOSURE

Novel trisubstituted triazines corresponding to the formula:

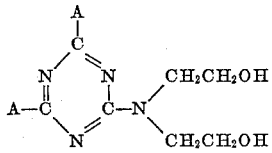

wherein A is alkoxy, aryloxy, alkyl or aryl. These compounds are useful as catalysts for preparing rigid cellular foams.

BACKGROUND OF THE INVENTION

(1) Field of the Invention

The present invention relates to new triazine compositions and in particular to disubstituted diethanolamino-s-triazines possessing catalytic activity.

(2) Prior Art

In U.S. Pat. No. 3,573,301 there is disclosed and claimed certain substituted triazine compounds for use as cross-linking agents in the manufacture of alkyds and polyesters, as well as intermediates in the preparation of urethane compounds. It has been found, however, that many of such compounds function, not as urethane intermediates, but as catalysts for the preparation of rigid cellular foams. Moreover, the reference patent discloses other related triazine compounds, allegedly designed to function similarly to the claimed compounds, but, again, many of such compounds have also been found to be catalysts for the preparation of rigid foams characterized by carbodiimide linkages.

The present invention provides triazine compositions related to, but distinct from those of the reference patent which also function as catalysts for the preparation of rigid cellular foams.

SUMMARY OF THE INVENTION

In accordance with the present invention there is provided novel catalysts for the preparation of rigid cellular foams. The catalysts correspond to the formula:

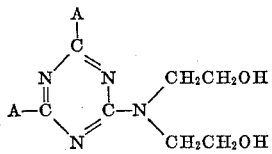

wherein A is alkoxy, aryloxy, alkyl or aryl.

For a more comprehensive discussion of the present invention, reference is made to the following detailed description and examples thereof.

DESCRIPTION OF THE PREFERRED EMBODIMENT

The present invention, generally, provides new compositions of matter which are catalysts for the preparation of rigid cellular foams.

The compositions of matter of the present invention are trisubstituted-s-triazine compounds corresponding to the formula:

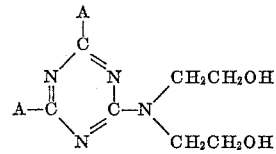

wherein A is alkoxy of from 1 to 6 carbon atoms, aryloxy of from 6 to 12 carbon atoms, alkyl of from 1 to 6 carbon atoms or aryl of from 6 to 12 carbon atoms.

Representative of the triazine compounds of the above formula include:

2,4-dimethyl-6-(di-2-hydroxyethylamino)-s-triazine
2,4-diethyl-6-(di-2-hydroxyethylamino)-s-triazine
2,4-dibutyl-6-(di-2-hydroxyethylamino)-s-triazine
2,4-di-t-butyl-6-(di-2-hydroxyethylamino)-s-triazine
2,4dihexyl-6-(di-2-hydroxyethylamino)-s-triazine
2,4-dimethoxy-6-(di-2-hydroxyethylamino)-s-triazine
2,4-diethoxy-6-(di-2-hydroxyethylamino)-s-triazine
2,4-dipropoxy-6-(di-2-hydroxyethylamino)-s-triazine
2,4-di-butoxy-6-(di-2-hydroxyethylamino)-s-triazine
2,4-diphenoxy-6-(di-2-hydroxyethylamino)-s-triazine
2,4-ditolyloxy-6-(di-2-hydroxyethylamino)-s-triazine
2,4-diphenyl-6-(di-2-hydroxyethylamino)-s-triazine
2,4-di(p-chlorophenyl)-6-(di-2-hydroxyethylamino)-s-triazine
2,4-dibenzyl-6-(di-2-hydroxyethylamino)-s-triazine As noted, these trisubstituted triazines are useful as catalysts for the preparation of rigid cellular foams, as is more particularly pointed out in copending U.S. patent application Ser. No. 319,559, filed on even date herewith.

In the case where the trisubstituted triazines of the present invention are dialkoxy- or diaryloxy-substituted, they may be prepared by either of two procedures. The first procedure is well known to the skilled artisan. Generally, this procedure comprises reacting one mole of cyanuric chloride with two moles of an active hydrogen compound. The resulting chlorotriazine is then separated from the reaction mixture and is then reacted with one mole of diethanolamine. Thus, for example, 2,4-diphenoxy-6-(di-2-hydroxyethylamino)-s-triazine is prepared by reacting one mole of cyanuric chloride with two moles of phenol to form 2-chloro-4,6-diphenoxy-s-triazine. This product is then separated out from the reaction mixture and a separate reaction is initiated between the 2-chloro-4,6-diphenoxy-s-triazine and diethanolamine in a 1:1 mole ratio to prepare 2,4 - diphenoxy - 6 - (di-2-hydroxyethyl-amino)-s-triazine. For a more detailed discussion of this process, reference is made to U.S. Pat. No. 3,573,301 and D. W. Kaiser et al., *J. Am. Chem. Soc.*, 73, 2984 (1951).

The second process for preparing the triazines is more particularly described in copending patent application Ser. No. 319,931 filed on even date herewith. This process generally comprises the sequential reaction of all the substituents and eliminating the precursor or intermediate separation step. In the case where the disubstituted triazines are dialkyl- or diaryl-substituted they are prepared by the reaction of one mole of cyanuric chloride with two moles of Grignard reactants, RMgX, where R is alkyl or aryl and X is halogen to prepare the disubstituted chlorotriazine which is thereafter reacted with diethanolamine.

As mentioned above, the disubstituted triazine compounds of the present invention have been found to be useful in the preparation of rigid cellular foams prepared by the catalytic condensation of an organic polyisocyanate. The preparation of such foams is well known in the art as evidenced by, inter alia, U.S. Pats. No.

3,657,161 and 3,645,923. Any of the polyisocyanates disclosed therein as well as the optional ingredients such as blowing agents, fillers, surfactants, polyols, etc., can be employed along with the disubstituted triazine catalysts of the present invention in the preparation of rigid cellular foams.

The following examples illustrate the invention. All parts are by weight unless otherwise indicated.

EXAMPLE I

A reaction vessel equipped with a reflux condenser, thermometer, addition funnel, heat exchange means and mechanical stirrer was charged with a slurry of 24 parts (0.08 mole) of 2-chloro-4,6-diphenoxy-s-triazine in 150 parts of water. With stirring, 8.5 parts (0.081 mole) of diethanolamine was added dropwise thereto and the resulting mixture was heated to reflux (101° C.). Upon reaching reflux, an aqueous solution of 3.2 parts (0.08 mole) of sodium hydroxide in 10 parts of water was added to the vessel at a rate sufficient to keep the reaction mixture neutral. After the hydroxide addition was completed, the contents of the reaction vessel were then refluxed for four hours, and then allowed to cool to room temperature. The white, crystalline solid precipitate was then recovered by filtration and dried to a yield of 24.2 parts of 2,4-diphenoxy-6-(di-2-hydroxyethylamino)-s-triazine which was then recrystallized from benzene to purify the product. A rigid cellular foam was prepared by heating an organic polyisocyanate and the above-identified triazine compound to an initiation temperature of between 110° C.–170° C. Examination of the infrared spectrum of the foam indicated the presence of carbodiimide, isocyanurate and isocyanate groups. Foams were also prepared by treating an organic polyisocyanate with the triazine compound along with a 1,3,5-tris(N,N-dimethylaminopropyl) - s-hexahydrotriazine trimerization catalyst, a silicone surfactant and a plasticizer at or below or above ambient temperature conditions. Foams exhibiting excellent flame retardant properties were obtained.

EXAMPLE II

A reaction vessel equipped as described in Example I was charged with 460 parts of absolute ethanol. Cyanuric chloride (92.2 parts) was then added portionwise over a period of thirty minutes maintaining the temperature of the reaction mixture between 25° C.–30° C. Upon completion of the addition, 168 parts of sodium bicarbonate was added to the charge over a period of one hour. After the addition of the sodium bicarbonate was completed, the reaction mixture was heated to reflux temperature, about 105° C., and maintained at this temperature for one hour. At this time, 57.8 parts (0.55 mole) of di-2-hydroxyethylamine was added to the charge over a period of thirty minutes. The contents of the vessel were heated at reflux (80° C.) for four hours, after which time the reaction mixture was filtered out to separate the inorganic material. The filtrate was concentrated to yield 124 parts (91%) of low melting solid 2,4 - diethoxy-6-(di-2-hydroxyethylamino)-s-triazine. A rigid cellular foam was prepared by heating an organic polyisocyanate and the above-identified triazine compound to an initiation temperature of between 110° C.–170° C. Examination of the infrared spectrum of the foam indicated the presence of carbodiimide, isocyanurate and isocyanate groups. Foams were also prepared by treating an organic polyisocyanate with the triazine compound along with a 1,3,5-tris(N,N-dimethylaminopropyl)-s-hexahydrotriazine trimerization catalyst, a silicone surfactant and a plasticizer at or below or above ambient temperature conditions. Foams exhibiting excellent flame retardant properties were obtained.

EXAMPLE III

Following the procedure described in Example I, a series of triazine compounds is prepared from diethanolamine and various chloro-substituted triazines. The particular chlorotriazines employed and the resulting s-triazines obtained are presented in Table I below. The s-triazines exhibit catalytic activity when heated with an organic polyisocyanate. Infrared analysis of the resulting foams indicates the presence of carbodiimide isocyanurate and isocyanate groups.

TABLE I

| Chlorotriazine reactant | S-triazine product |
| --- | --- |
| 2-chloro-4,6-dimethyl-s-triazine | 2,4-dimethyl-6-(di-2-hydroxyethylamino)-s-triazine. |
| 2-chloro-4,6-diethyl-s-triazine | 2,4-diethyl-6-(di-2-hydroxyethylamino)-s-triazine. |
| 2-chloro-4,6-dimethoxy-s-triazine | 2,4-dimethoxy-6-(di-2-hydroxyethylamino)-s-triazine. |
| 2-chloro-4,6-diethoxy-s-triazine | 2,4-diethoxy-6-(di-2-hydroxyethylamino)-s-triazine. |
| 2-chloro-4,6-ditolyl-s-triazine. | 2,4-ditolyl-6-(di-2-hydroxyethylamino)-s-triazine. |

The embodiments of the invention in which an exclusive property or privilege is claimed are defined as follows:

What is claimed is:

1. A triazine compound of the formula:

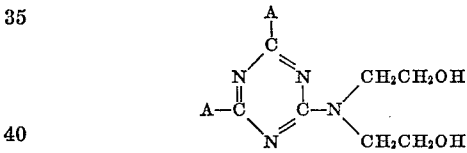

wherein A is alkoxy of from 1 to 4 carbon atoms, alkyl of from 1 to 4 carbon atoms, phenoxy, tolyloxy, phenyl, benzyl or p-chlorophenyl.

2. The triazine of claim 1 wherein A is alkoxy of from 1 to 4 carbon atoms.

3. The triazine of claim 2 wherein A is ethoxy.

4. The triazine of claim 1 wherein A is phenoxy.

5. The triazine of claim 1 wherein A is alkyl of from 1 to 4 carbon atoms.

6. The triazine of claim 1 wherein A is phenyl.

References Cited

UNITED STATES PATENTS 3,573,301   3/1971   Winter _____ 260—249.6

OTHER REFERENCES

Kaiser et al., J. Am. Chem. Soc., vol. 73, pp. 2984–6 (1951).

JOHN M. FORD, Primary Examiner

U.S. Cl. X.R.

260—2.5 AC